(12) United States Patent
Kram et al.

(10) Patent No.: US 6,317,694 B1
(45) Date of Patent: Nov. 13, 2001

(54) METHOD AND APPARATUS FOR SELECTING A SAND PACK MESH FOR A FILTER PACK AND A WELL CASING SLOT SIZE FOR A WELL

(75) Inventors: Mark L. Kram, Santa Barbara, CA (US); Jeffrey A. Farrar, Littleton, CO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/645,562

(22) Filed: Aug. 24, 2000

(51) Int. Cl.[7] .................................................. G01V 3/38
(52) U.S. Cl. .................................................... 702/11
(58) Field of Search ................................... 702/11, 12, 9, 702/7, 6; 73/152.19, 152.28

(56) References Cited

U.S. PATENT DOCUMENTS 5,664,628 * 9/1997 Koehler et al. ...................... 166/369

* cited by examiner

*Primary Examiner*—Donald E. McElheny, Jr.
(74) *Attorney, Agent, or Firm*—David Kalmbaugh (57) ABSTRACT

A method and apparatus for selecting a filter pack and a well casing slot size for a well which uses soil classification data derived from cone penetrometer test. A user of the method and apparatus utilizes a piezocone or other soil classification sensors to measure soil properties in an area of contaminated soil or non-contaminated soil and then determine the soil type at specific depths within the soil. A multisensor probe generates a laser induced fluorescence intensity plot of the area of soil contamination which is superimposed on a soil boring log identifying the soil type at specific depths within the soil. The soil type for the area of contaminated soil is identified from the load cell data. Contamination within the soil is identified using the laser induced fluorescence intensity plot.

13 Claims, 7 Drawing Sheets

METHOD AND APPARATUS FOR SELECTING A SAND PACK MESH FOR A FILTER PACK AND A WELL CASING SLOT SIZE FOR A WELL

BACKGROUND OF THE INVENTION

1. Field of the Invention

The present invention relates generally to a method and apparatus for fabricating a well used for monitoring and remediation of contaminated soil and ground water. More specifically, the present invention relates to a method and apparatus for selecting a sand pack mesh for a filter pack and a well casing slot size for a well using soil classification data derived from a cone penetrometer test.

2. Description of the Prior Art

In a standard well, a bore hole is first drilled into the ground. Normally, the well water is sampled as part of a water quality monitoring program. A well casing is then inserted into the bore hole. Normally, the well casing houses a pumping mechanism or other mechanical components which comprise the operational features of the particular well.

The well casing will normally include a portion that is permeable to groundwater. The remainder of the well casing is typically impermeable to insure proper hydraulic flow of the liquids through the well casing at a specific depth intervals, as dictated by the design of the casing.

The space in between the exterior surface of the well casing and the interior surface of the bore hole is then filled with an annular fill material. This annular fill material, which operates as a filter or cleaning device, may be a permeable material, such as gravel or sand.

Water, which is pumped through the well is directed through a filter or cleaning device placed in the annular space of the well casing. Ground water so directed will capture impurities or contaminants leached or dissolved from the surrounding soils into the groundwater, thus passing impurities or contaminants from the surrounding soils to the filter or cleaning device along the screened portion of the well casing.

In the past selection of the filter (also known as the gravel pack or primary filter pack) and well casing slot size which is based on the filter pack was an extremely time consuming, expensive and difficult process requiring soil sampling, sieve analysis, and reference to standard recommendations. What is needed is a relatively simple method and apparatus by which a user can select the sand pack mesh and the well casing slot size when the soil type which is contaminated has been identified.

SUMMARY OF THE INVENTION

The present invention overcomes some of the disadvantages of the prior art including those mentioned above in that it comprises a relatively simple yet highly effective method and apparatus for selecting a filter pack and the well casing slot size for a well which uses soil classification data derived from cone penetrometer tests.

The user of the method and apparatus of the present invention uses a piezocone to measure soil properties in an area of contaminated soil or non-contaminated soil and then determine the soil type at specific depths within the soil. The soil doesn't always need to be contaminated. Sometimes wells are installed in clean areas to determine background chemistry and hydrologic properties.

A multisensor probe, such as a probe that generates a laser induced fluorescence intensity plot of the area of soil contamination which is superimposed on a soil boring log identifying the soil type at specific depths within the soil can lead to a detailed subsurface characterization. The soil type for the area of contaminated soil is identified from load cell data and the contamination is identified by the laser induced fluorescence intensity plot. When the user identifies the soil type for the area of soil contamination, the user accesses one of a pair of lookup tables to select the sand pack mesh and the well casing slot size for the specified zone. The lookup tables sets forth the filter pack and well screen slot size for soil descriptors based on the 9-scale and soil descriptors based on the 12-scale of Robertson and Campanella.

DETAILED DESCRIPTION OF THE PREFERRED EMBODIMENT

Figure 1:
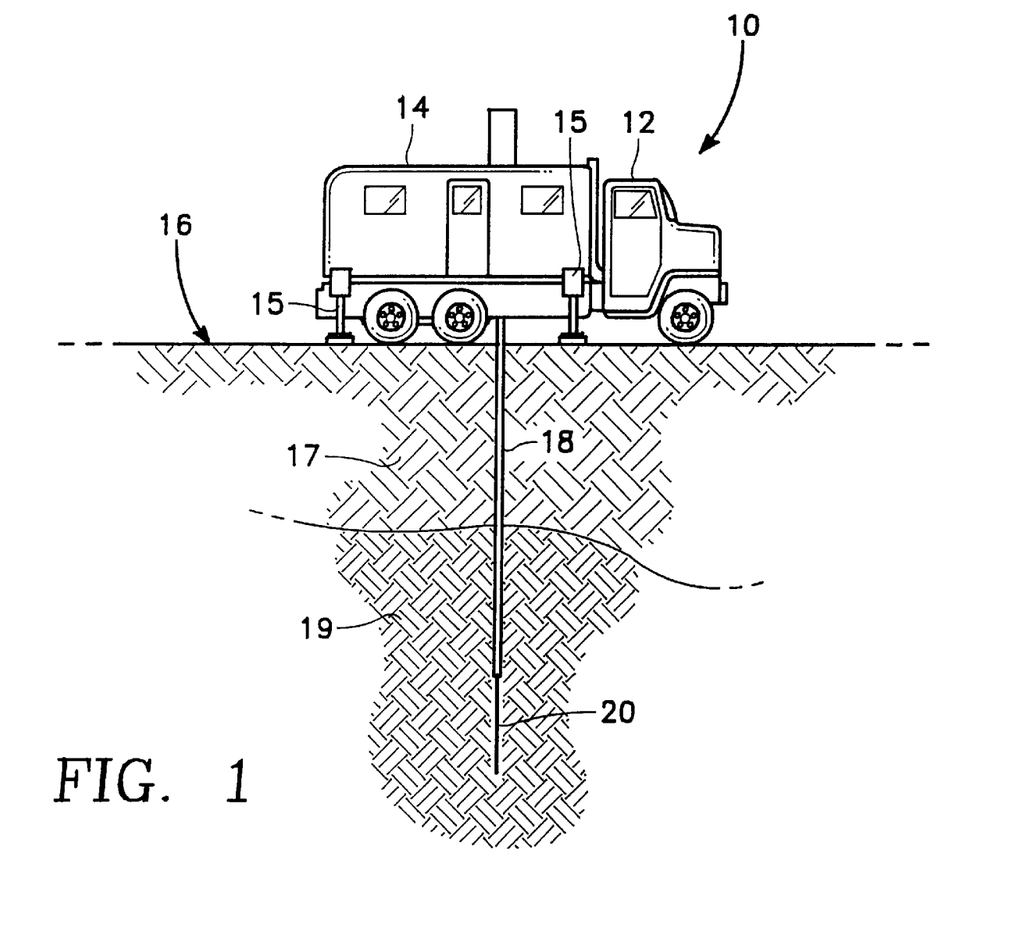
FIG. 1 is a plain view of electric cone penetration test assembly used with a piezocone or other penetrometer sensors (e.g. load cells) for deriving the soil classification data used in the method of the present invention.

Referring first to FIG. 1, there is shown a electric cone penetration test system 10 which may be used during environmental groundwater investigations as an efficient means of hydrogeologic site characterization and subsurface plume tracking. Test system 10 includes a multi-axle truck 12 which has mounted inside its rear compartment 14 a plurality of heaving hydraulic rams (not illustrated). Position at each corner of the rear compartment 14 of truck 12 is a leveling stanchion 15 which provides support for truck 12 and maintains truck 12 in a fixed position relative to the ground 16.

Figure 2:
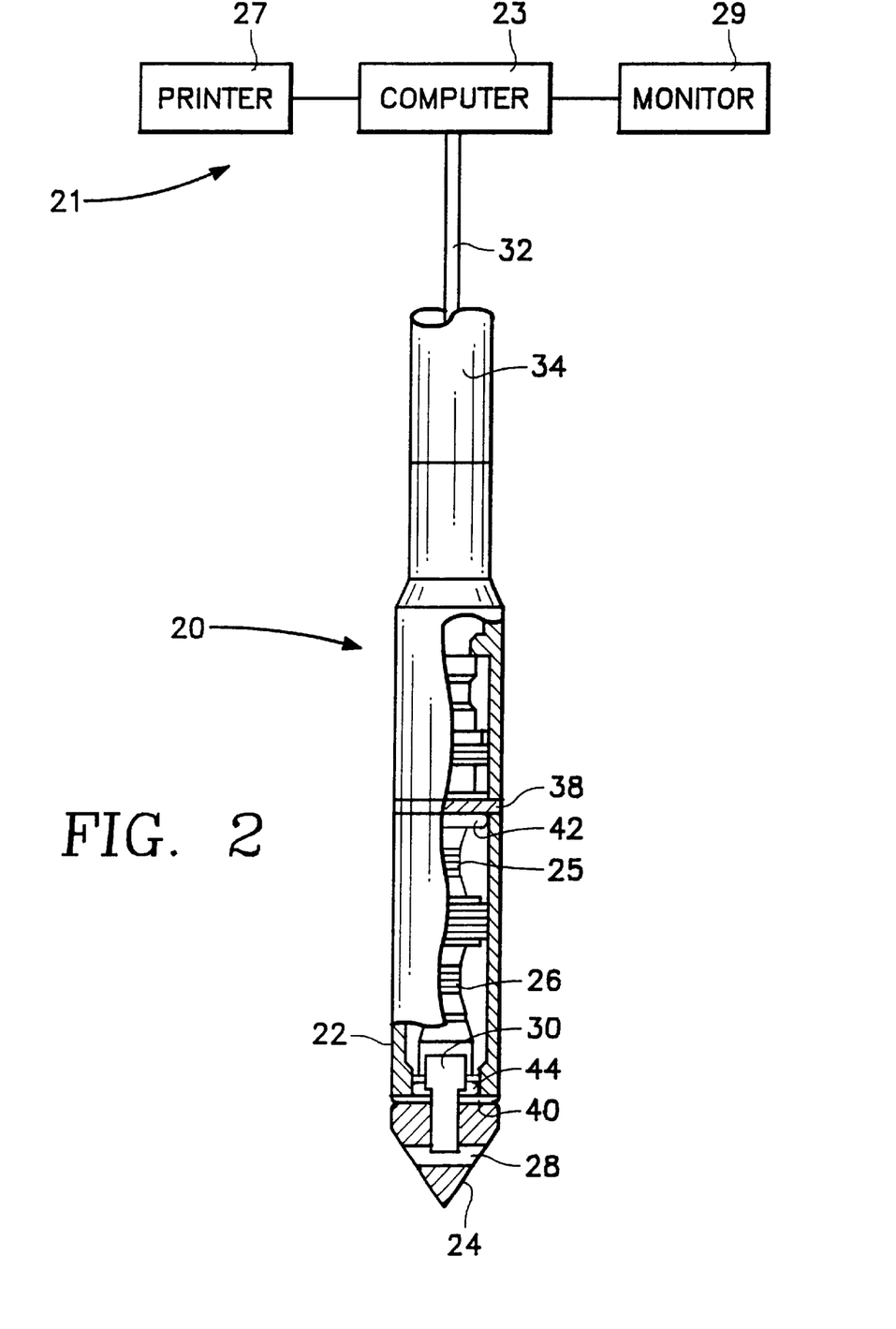
FIG. 2 is a view, in partial section, of the piezocone of FIG. 1.

Extending vertically downward from the underside of multi-axle truck 12 into the ground 16 is a string of steel pipes 18. Attached to the end of steel pipes 18 is a piezocone 20 which is depicted in FIG. 2 in section. Each steel pipe of the string of steel pipes 18 is approximately one meter in length and is generally pushed into the ground at a constant penetration rate of 2 cm/sec, one pipe length at a time. The pushing force exerted on pipes 18 and piezocone 20 is supplied by the hydraulic rams within compartment 14 of truck 12. The weight of truck 12 provides the reaction force to push against pipes 18 and can be as large as twenty tons.

The string of steel pipes 18 has additional pipes added to the upper end of string 18 by means of a tapered threaded joint (not illustrated).

The on board data acquisition system 21 of FIG. 2 for test system 10 converts analog electrical signals received from piezocone 20 into digital data, and then stores the data at small depth increments (typically about one inch) on a personal digital computer system 23 also mounted inside compartment 14 of truck 12. The data is also displayed on a monitor 29 mounted inside of compartment 14 of truck 12. A printer 27 can also be connected to the computer 23 to provide an automatic log of penetration upon completion of the test.

Referring to FIG. 2, there is shown a detailed view of piezocone 20. Piezocone 20 includes a friction sleeve 22 and a conical tip or cone 24 attached to the lower end of friction sleeve 22. Conical tip 24 is removable from friction sleeve 22. Conical tip 24 develops the end bearing component $q_c$ of penetration resistance. Friction sleeve 22 is an isolated cylindrical sleeve positioned above tip 24 which senses the resistance of the soil as sleeve 22 passes through the soil. The Friction sleeve resistance $f_s$ is determined by dividing the soil friction by the friction sleeve area. The cone resistance $q_c$, the friction sleeve resistance $f_s$ and the pore pressure can then be used to generate the soil classification charts illustrated in FIGS. 3, 4, 5 and 6.

Mounted within friction sleeve 22 are a pair of strain gauge load cells 25 and 26 which measure the soil bearing resistance acting on conical tip 24 and the soil shear resistance sensed along the cylindrical friction sleeve 22 as piezocone 20 penetrates the ground soil 16. The pore water pressure is measured by a porous element or filter 28 mounted in conical tip 24 of piezocone 20 and a pressure transducer 30 mounted in cylindrical friction sleeve 22 of piezocone 20.

It should be noted that the porous element or filter may be mounted above the conical tip of the piezocone.

In addition, piezocone 20 also has an inclinometer (not illustrated) which is used to monitor the verticality of the environmental groundwater test performed by piezocone 20.

The test performed by piezocone 20 are recorded continuously as a function of depth and transmitted through an electrical cable 32 which extends from the upper end of piezocone 20 through a coupler 34 and pipes 18 (FIG. 1) to the rear compartment 14 of truck 12. The end of electrical cable 32 is connected to computer 23 of the on board data acquisition system 21 for test system 10 allowing test data from piezocone 20 to be transmitted to the data acquisition system 21 for test system 10. It is also possible to use wireless to transmit test data from piezocone 20 to computer 23.

The sleeve 22 of piezocone 20 also has at its upper end a quad ring 38 and at its lower end a quad ring 40. Similarly, there is located near the upper end of sleeve 22 an "O" ring 42, while there is located near the lower end of sleeve 22 an "O" ring 44. Quad rings 38 and 40 and "O" rings 42 and 44 function to insure that interior portion of sleeve 22 is water tight.

Figure 3:
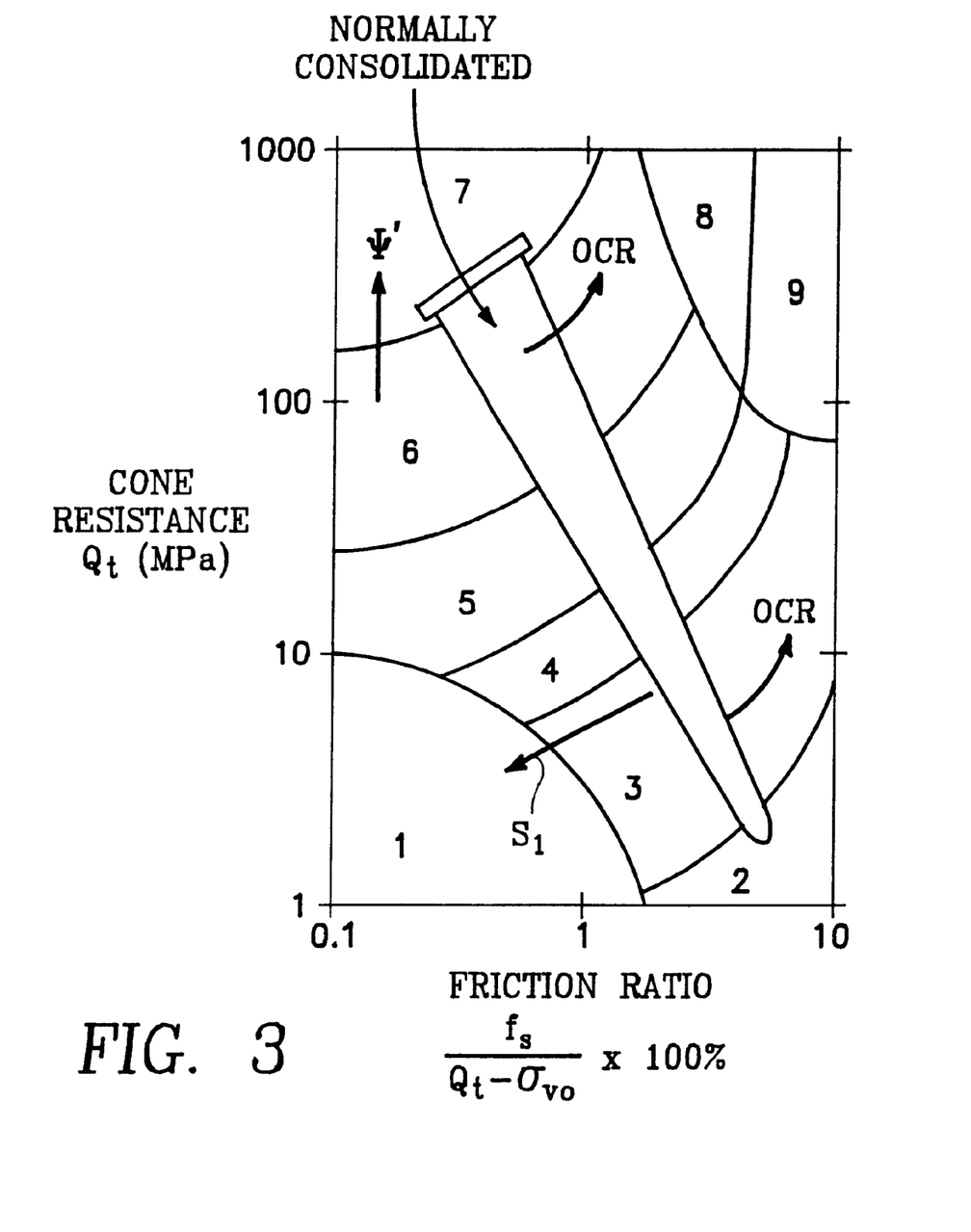
FIGS. 3 and 4 are nine scale soil behavior charts.
Figure 4:
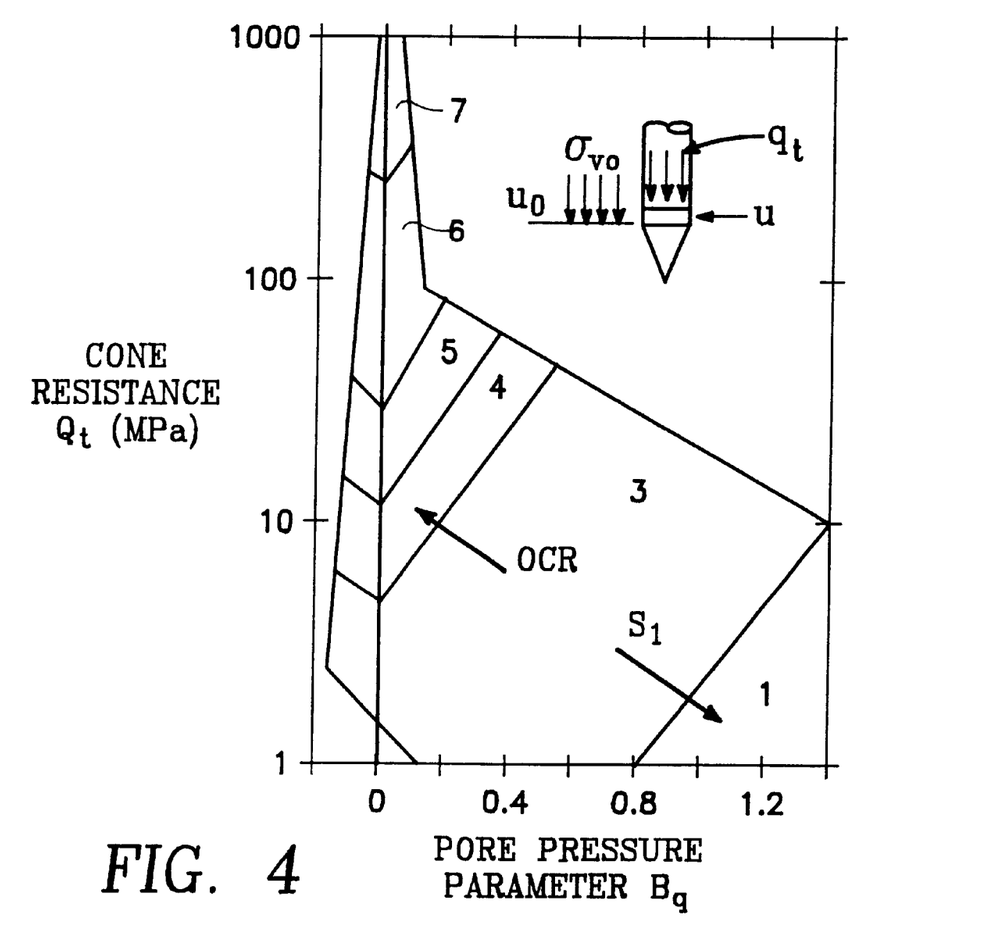

Referring to FIGS. 3 and 4 there are shown soil classification charts or plots for nine scale soil behavior. In the plots of FIGS. 3 and 4, the soil types are as follows:

| | |
|---|---|
| zone 1 | Sensitive, fine grain |
| zone 2 | Organic, soils-peats |
| zone 3 | Clays-clays to silty clay |
| zone 4 | Silt mixtures clayey silt to silty clay |
| zone 5 | Sand mixtures; silty sand to sandy silt |
| zone 6 | Sands; clean sand to silty sands |
| zone 7 | Gravely sand to sands |
| zone 8 | Very stiff sand to clayey sand |
| zone 9 | Very stiff fine grained |

Figure 5:
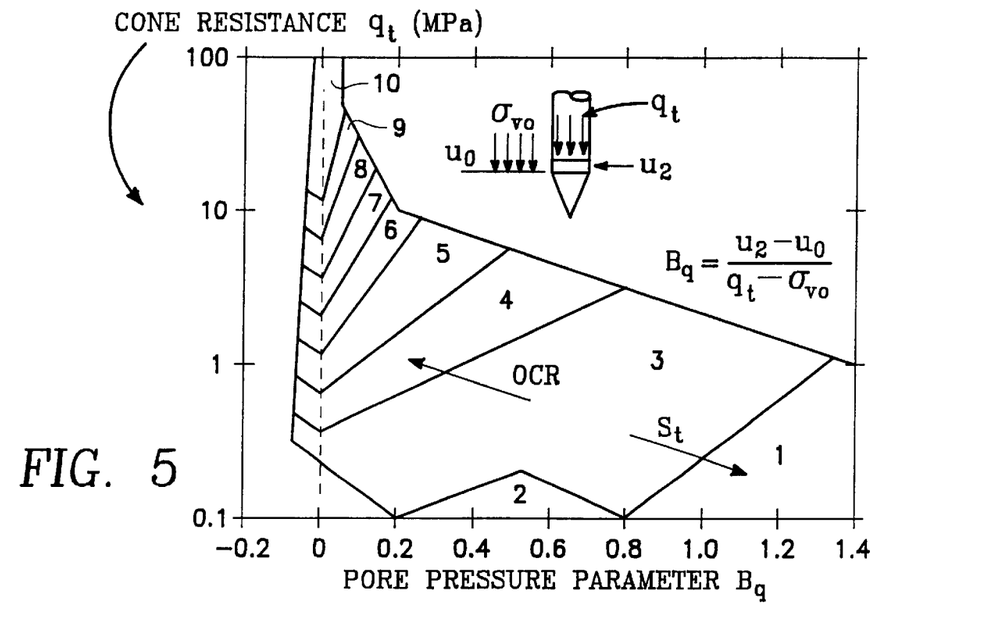
FIGS. 5 and 6 are twelve scale soil behavior charts.
Figure 6:
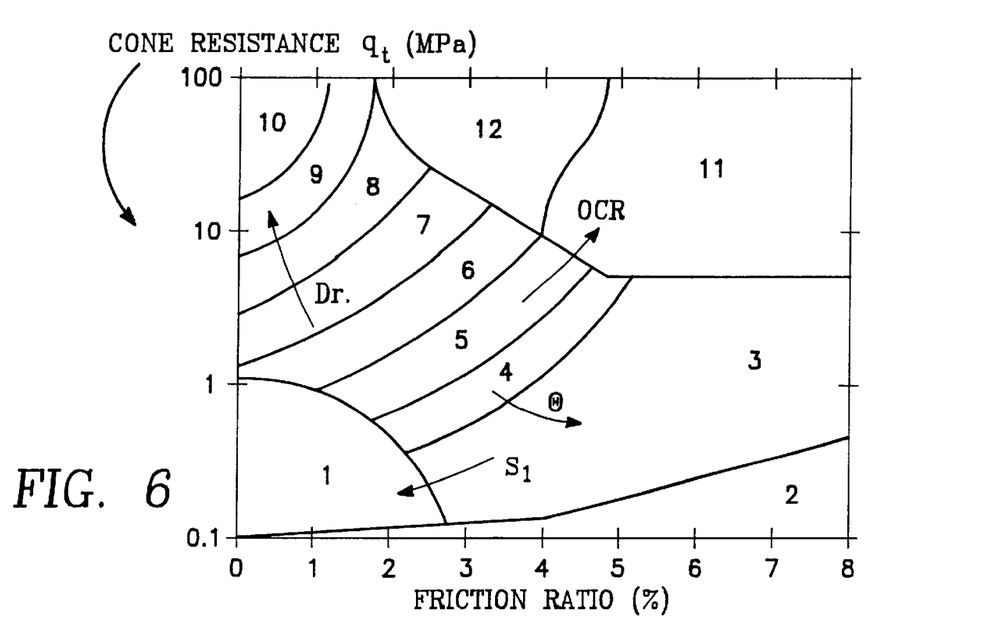

Referring to FIGS. 5 and 6 there are shown soil classification charts or plots for nine scale soil behavior. In the plots of FIGS. 5 and 6, the soil types are as follows:

| | |
|---|---|
| zone 1 | Sensitive, fine grain |
| zone 2 | Organic material |
| zone 3 | Clay |
| zone 4 | Silty clay to clay |
| zone 5 | clayey silt to silty clay |
| zone 6 | Sandy silt to clayey silt |
| zone 7 | Silty sand to sandy silt |
| zone 8 | Sand to silty sand |
| zone 9 | Sand |
| zone 10 | Gravely sand to sand |
| zone 11 | Very stiff fine grained |
| zone 12 | Sand to clayey sand |

Figure 7:
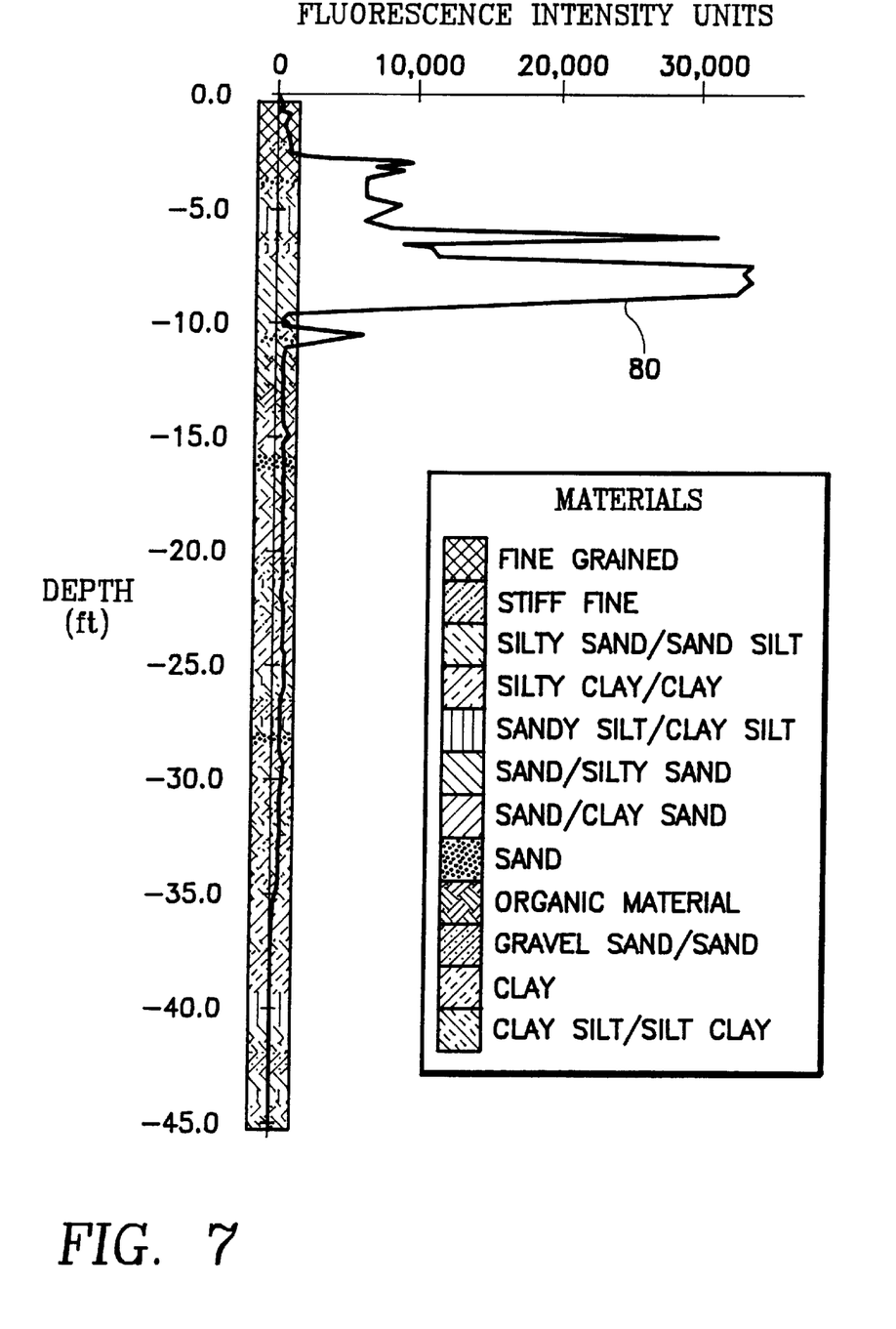
FIG. 7 illustrates a laser induced fluorescence intensity plot wherein soil type is superimposed on a chart depicting soil contamination.

The cone resistance $q_c$ and the friction sleeve resistance $f_s$, obtained from measurements made by piezocone 20 and other direct push soil measurement devices is used to generate the nine-scale soil behavior charts of FIGS. 3 and 4 and the twelve-scale behavior charts of FIGS. 5 and 6. This soil-behavior data is also used to generate the materials identifier located on the lower right side of FIG. 7. The materials identifier of FIG. 7 is for contaminated soils and non-contaminated soils having up to twelve soil types.

The filter pack for the well consist of a granular material of a selected grain size and gradation that is installed in the annulus between the well screen and the borehole well. The filter pack is usually selected to have a 30% finer (d-30) grain size that is about 4 to 10 times greater than the 30% finer (d-30) grain size of the hydrologic unit being filtered (see FIG. 8 which is an example of a grading curve used in the selection of the filter pack). The filter pack is usually selected to have a low uniformity coefficient, that is less than ten. The grain size and gradation of the filter pack are selected to stabilize a soil section adjacent the well screen and permit only the finest soil grains to enter the well screen.

The filter pack is graded and comprised of hard durable siliceous particles washed and screened with a particle size distribution derived normally by multiplying the d-30 size of the finest-grained screened stratum by a factor between 4 and 10. If the stratum is fine and uniform, a number between four and ten is used as the multiplier. When the material has a highly nonuniform gradation and includes silt-sized particles, a number between six and ten is used as the multiplication factor. The grain-size distribution of the filter pack is then plotted using the d-30 size as the control point on the graph.

Figure 8:
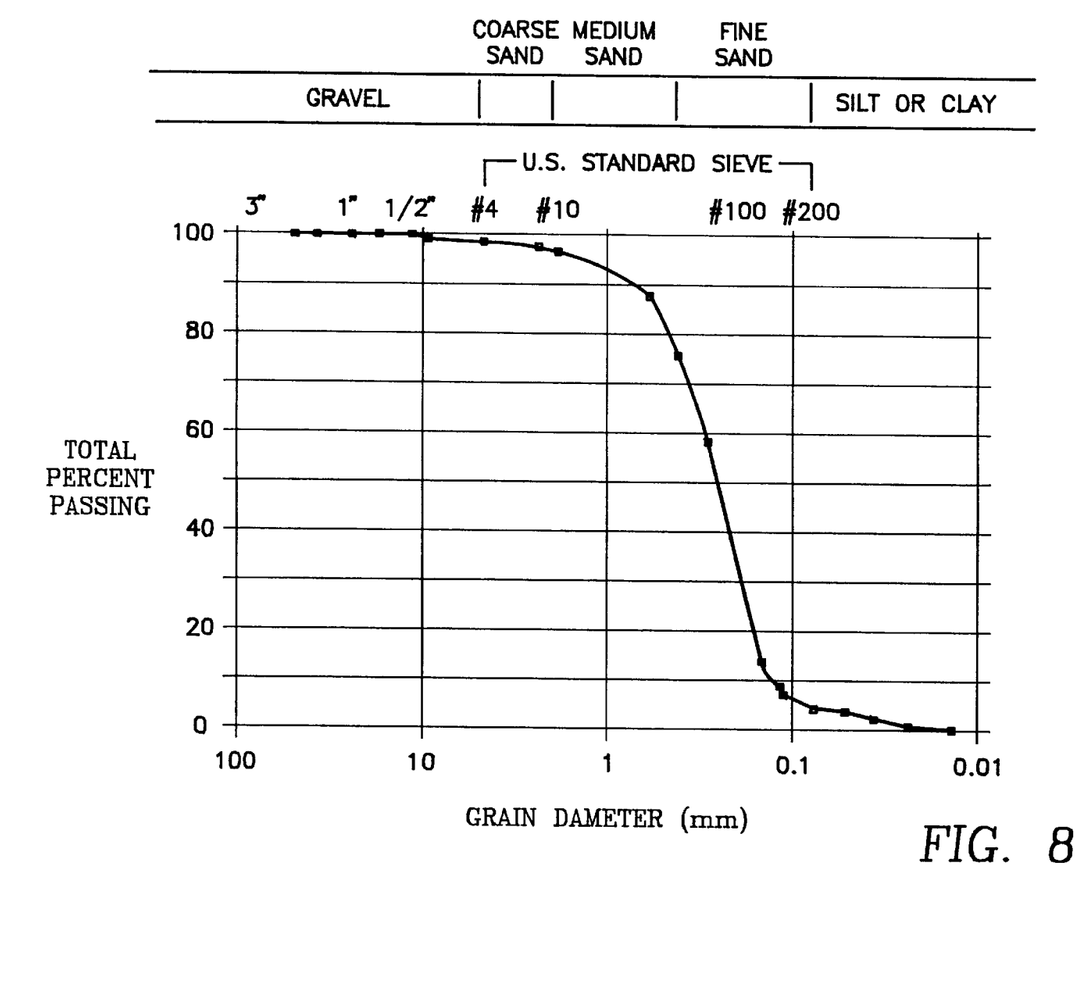
FIG. 8 is a grading curve used in the selection of the filter pack.

FIG. 8 is representative of a plot for the grain size distribution of a filter pack. The selected filter pack should have a uniformity coefficient of approximately 2.5 or less.

Common filter pack materials include coarse 4 to 8 mesh silica sand; standard 20 to 40 mesh silica sand; and ultra-fine 100 mesh silica sand Referring to FIG. 8, the data set forth in the following Tables was obtained from multiple grading curves such as the grading curve illustrated in FIG. 8. The data in the following tables shows particle size (Grain Diameter-millimeters) verses total percent passing for U.S. Standard seive numbers and other seive numbers and Soil Qualifiers (9-Scale). The only soils considered in formulating the following Tables were Zones 7, 6, 5, 4 and 3 soils.

TABLE I

| Sieve Type | Particle Diameter (mm) | 7-high | 7-low | 6-high | 6-low |
|---|---|---|---|---|---|
| 3" | 76.2 | 100 | | | |

TABLE I-continued

| Sieve Type | Particle Diameter (mm) | 7-high | 7-low | 6-high | 6-low |
|---|---|---|---|---|---|
| 1.5" | 38.1 | 70 | | | |
| ¾" | 19.05 | 45 | 100 | 100 | |
| ⅜" | 9.525 | 23 | 80 | 90 | |
| #4 | 5 | 0 | 70 | 60 | |
| #8 | | | 60 | 37 | 100 |
| #10 | 2 | | 42 | | |
| #16 | | | 28 | 17 | 70 |
| #30 | | | 18 | 0 | |
| #40 | 0.4 | | | | 46 |
| #50 | | | 12 | | 32 |
| #100 | | | 7 | | 28 |
| #200 | 0.08 | | 5 | | 20 |

TABLE II

| Sieve Type | Particle Diameter (mm) | 5-high | 5-low | 4-high | 4-low |
|---|---|---|---|---|---|
| 3" | 76.2 | | | | |
| 1.5" | 38.1 | | | | |
| ¾" | 19.05 | 100 | | | |
| ⅜" | 9.525 | 80 | | | |
| #4 | 5 | 70 | 100 | | |
| #8 | | 56 | | | |
| #10 | 2 | | 81 | | |
| #16 | | 45 | 100 | 67 | |
| #30 | | 37 | 85 | 55 | |
| #40 | 0.4 | | | | 100 |
| #50 | | 31 | 71 | 45 | 87 |
| #100 | | 26 | 60 | 37 | 74 |
| #200 | 0.08 | 21 | 50 | 30 | 65 |
| | 0.037 | 16 | 42 | 26 | 57 |
| | 0.019 | 10 | 32 | 23 | 50 |
| | 0.009 | 7.5 | 22 | 21 | 42.5 |
| | 0.005 | 5 | 15 | 20 | 40 |

TABLE III

| Sieve Type | Particle Diameter (mm) | 3-high | 3-low |
|---|---|---|---|
| #16 | | 100 | |
| #30 | | 80 | |
| #40 | 0.4 | | |
| #50 | | 65 | |
| #100 | | 50 | 100 |
| #200 | 0.08 | 40 | 95 |
| | 0.037 | 35 | 87 |
| | 0.019 | 31 | 78 |
| | 0.009 | 27.5 | 70 |
| | 0.005 | 25 | 65 |

The data included in Tables I, II and III was compared with the following data from ASTM (American Society For Testing and Materials) standard D5092-90 entitled "Standard Practice for Design and Installation of Ground Water Monitoring Wells in Aquifers" to generate a Lookup Table which sets forth the filter pack and well screen slot size for soil descriptors 9-scale and soil descriptors 12-scale.

TABLE IV

| Size of Screen Opening mm (in.) | Slot No. | Sand Pack Mesh Size Names | 30% Passing Size mm D-30 |
|---|---|---|---|
| 0.125 (0.005) | 5 | 100 | 0.17 to 0.21 |
| 0.25 (0.010) | 10 | 20 to 40 | 0.5 to 0.6 |
| 0.50 (0.020) | 20 | 10 to 20 | 1.2 to 1.5 |

TABLE IV-continued

| Size of Screen Opening mm (in.) | Slot No. | Sand Pack Mesh Size Names | 30% Passing Size mm D-30 |
|---|---|---|---|
| 0.75 (0.30) | 30 | 10 to 20 | 1.2 to 1.5 |
| 1.0 (0.40) | 40 | 8 to 12 | 1.7 to 2.0 |
| 1.5 (0.60) | 60 | 6 to 9 | 2.5 to 3.0 |
| 2.0 (0.80) | 80 | 4 to 8 | 2.6 to 3.1 |

The following Table allows the user to select a filter pack and well screen slot size for soil descriptors 9-scale.

TABLE V

| Soil Descriptor 9-scale | Recommended Sand Pack Mesh | Recommended Slot # |
|---|---|---|
| 3 | 100 | 5 |
| 4 | 100 | 5 |
| 5 | 100 | 5 |
| 6 | 20 to 40 | 10 |
| 7 | 4 to 8 | 80 |

The following Table allows the user to select a filter pack and well screen slot size for soil descriptors 12-scale.

TABLE VI

| Soil Descriptor 12-scale | Recommended Sand Pack Mesh | Recommended Slot # |
|---|---|---|
| 3 | 100 | 5 |
| 4, 5, 6 | 100 | 5 |
| 7 | 100 | 5 |
| 8, 9 | 20 to 40 | 10 |
| 10 | 4 to 8 | 80 |

Although screening in soil types 1, 2, 8 and 9 (Soil Descriptor 9-scale) is not recommended, the user may select a 100 or finer sand pack mesh and a 5 or finer slot number when screening is required. Similarly, screening in soil types 1, 2, 11 and 12 (Soil Descriptor 12-scale) is not recommended, the user may select a 100 or finer sand pack mesh and a 5 or finer slot number when screening is required.

Referring to FIGS. 1 and 7 there is shown a plot generated by a multisensor probe in which the soil type is identified and an area of contamination is also identified at a depth of from about 2.5 feet to a depth of about 10 feet with significant contamination occurring at a depth of from about 6 feet to about 10 feet. The probe 20, which may be a multisensor probe, provides for laser induced fluorescence to locate the area of contamination 80 which may be, for example, petroleum contamination. This allows for a plot 80 of the area of contamination after the data from the probe is analyzed by a computer such as computer 23. The probe 20 also provides load cell data which allows computer 23 to identify the soil type at various depths. After the data has been analyzed by computer 23, printer 27 generates the plot of FIG. 7.

The plot of FIG. 7 depicts identifies significant contamination at a depth of between 7 and 10 feet where the soil type is silty sand to sandy silt. Silty sand to sandy silt is defined in the twelve-scale soil behavior charts of FIGS. 5 and 6 as a zone 7 soil. For zone 7 soils the lookup table (12-scale) recommends a sand pack mesh of 100 and a slot number of five.

Between five and six feet the soil type is identified as sandy silt/clay silt which is a zone six soil. For zone six soils the lookup table recommends a sand pack mesh of 100 and a slot number of five.

At this time it should be noted, depth ranges of well screens, which is critical for monitoring and extraction well networks also can be determined by data from the piezocone and load cell sensors. Computer software incorporating Lookup Tables V and VI may be developed and used to determine well specifications in log form in real-time.

From the foregoing, it may readily be seen that the present invention comprises a new, unique and exceedingly useful method for selecting a sand pack mesh and a well casing slot size for a well which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A system for selecting a filter pack and a well casing slot size for a well comprising:
   probe means for measuring soil parameters within a soil having contaminants residing therein and providing electrical signals representative of said soil parameters;
   computing means for receiving said electrical signals, said computing means processing said electrical signals to provide a soil boring log identifying a soil type at each of a plurality of depths of penetration of said probe within said soil;
   said computing means processing said electrical signals to provide a plot of an area of said soil wherein said contaminants reside within said soil;
   said computing means overlaying said plot on said soil boring log to allow for an identification of the soil type containing the area of said soil having said contaminants residing therein; and
   lookup table means for selecting said filter pack and said well casing slot size for said well when said soil type for the area of said soil having said contaminants is identified.

2. The system of claim 1 wherein said probe means comprises a multisensor probe.

3. The system of claim 1 wherein said computing means comprises a digital computer.

4. The system of claim 1 wherein said plot is a laser induced fluorescence plot resulting from a laser induced fluorescence generated by said probe means.

5. The system of claim 1 wherein said lookup table means includes a sand pack mesh for said filter pack having a range of from eight to one hundred with said sand pack mesh for said filter pack being selected when said soil type for the area of said soil having said contaminants is identified.

6. The system of claim 1 wherein said lookup table means includes a slot number having a range of from five to eighty which represents said well screen slot size, said slot number being selected when said soil type for the area of said soil having said contaminants is identified.

7. A system for selecting a sand pack mesh for a filter pack and a well casing slot size for a well comprising:
   a multisensor probe for measuring soil parameters within a soil having contaminants residing therein and providing electrical signals representative of said soil parameters;
   a digital computer connected to said multisensor probe for receiving said electrical signals, said digital computer processing said electrical signals to provide a soil boring log identifying a soil type at each of a plurality of depths of penetration of said probe within said soil;
   said digital computer processing said electrical signals to provide a plot of an area of said soil wherein said contaminants reside within said soil;
   said digital computer overlaying said plot on said soil boring log to allow for an identification of the soil type containing the area of said soil having said contaminants residing therein;
   a monitor connected to said digital computer for providing an image of said plot overlayed on said soil boring log;
   a lookup table located in proximity to said monitor for selecting the sand pack mesh for said filter pack and the well casing slot size for said well when said image appears on said monitor and said soil type for the area of said soil having said contaminants is identified by viewing said monitor.

8. The system of claim 7 further comprising a printer connected to said digital computer for providing a print out of said plot overlayed on said soil boring log.

9. The system of claim 7 wherein said sand pack mesh for said filter pack has a range of from eight to one hundred with said sand pack mesh for said filter pack being selected when said soil type for the area of said soil having said contaminants is identified.

10. The system of claim 7 wherein said plot is a laser induced fluorescence plot resulting from a laser induced fluorescence generated by said multisensor probe.

11. The system of claim 7 wherein said lookup table means includes a slot number having a range of from five to eighty which represents said well screen slot size, said slot number being selected when said soil type for the area of said soil having said contaminants is identified.

12. A method for selecting a sand pack mesh for a filter pack and well casing slot size for a well comprising the steps of:
   a. measuring soil parameters within a soil having contaminants residing therein;
   b. providing electrical signals representative of said soil parameters;
   c. processing said electrical signals to generate a soil boring log identifying a soil type at each of a plurality of depths of penetration of said probe within said soil and a plot of an area of said soil wherein said contaminants reside within said soil;
   d. overlaying said plot on said soil boring log allowing for an identification of the soil type containing the area of said soil having said contaminants residing therein;
   e. providing a visual image of said plot overlayed on said soil boring log;
   f. selecting from a lookup table the sand pack mesh for said filter pack and the well casing slot size for said well by viewing said visual image to identify said soil type for the area of said soil having said contaminants contained therein.

13. The method of claim 12 further comprising the step of generating a laser induced fluorescence within said soil to allow for a measurement and a generation of the plot depicting the area of said soil having said contaminants contained therein.

* * * * *